United States Patent [19]

Park

[11] Patent Number: 5,132,782
[45] Date of Patent: Jul. 21, 1992

[54] INTERLEAVE DETECTOR OF COMPOSITE VIDEO SIGNAL

[75] Inventor: Yung-Jun Park, Suweon, Rep. of Korea

[73] Assignee: Samsung Electronics Co., Ltd., Suweon, Rep. of Korea

[21] Appl. No.: 572,223

[22] Filed: Aug. 24, 1990

[30] Foreign Application Priority Data

Oct. 5, 1989 [KR] Rep. of Korea .................. 89-14273

[51] Int. Cl.⁵ .................. H04N 9/45; H04N 9/445
[52] U.S. Cl. .................. 358/19; 358/31
[58] Field of Search .................. 358/19, 31

[56] References Cited

U.S. PATENT DOCUMENTS 4,636,842 1/1987 Hartmeier .................. 358/31
4,809,060 2/1989 Saeki .................. 358/31

FOREIGN PATENT DOCUMENTS 54-146524 11/1979 Japan .................. 358/31

Primary Examiner—Michael Razavi
Assistant Examiner—Wendy R. Greening
Attorney, Agent, or Firm—Cushman, Darby & Cushman

[57] ABSTRACT

An interleave detector between a horizontal synchronous signal and a chrominance subcarrier signal comprises a 1H delay part, an adder, a squarer, a low pass filter and a comparator for achieving a high quality of image. The interleave detector detects the interleave between the horizontal synchronous signal and the chrominance subcarrier signal of a composite video signal in such a manner that a burst signal of the composite video signal is 1H delayed and added to the original signal thereof for squaring the added output so as to extract the phase error by filtering the squared output through the low pass filter.

3 Claims, 5 Drawing Sheets

FIG. 3 (A) PRIOR ART
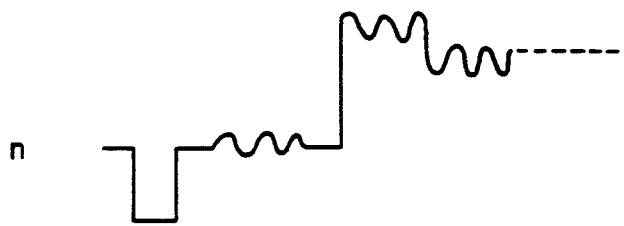
n
FIG. 3 (B) PRIOR ART
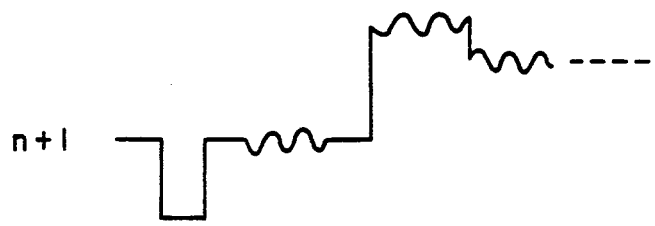
n+1
FIG. 3 (C) PRIOR ART
$\frac{n+(n+1)}{2}$
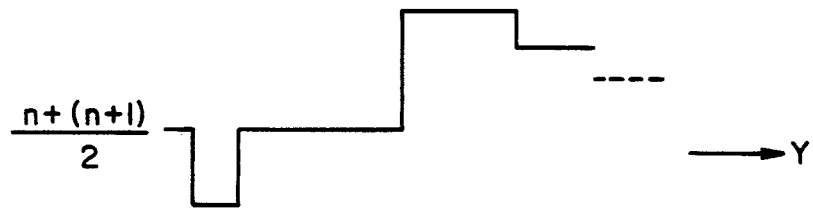
→ Y
FIG. 3 (D) PRIOR ART
$\frac{n-(n+1)}{2}$
→ C

INTERLEAVE DETECTOR OF COMPOSITE VIDEO SIGNAL

BACKGROUND OF THE INVENTION

1. Field of the Invention

The present invention relates to a circuit for determining the selection of a filter which separates luminance signal Y and a chrominance signal C from a composite video signal in the digital video signal processing technology, and more particularly to a circuit for detecting an interleave relation between a horizontal synchronous signal and a chrominance subcarrier signal.

2. Description of the Prior Art

FIG. 1 is a block diagram of a conventional signal process for providing the chrominance signal corresponding to the three primary colors of light of red R, green G and blue B by separating the composite video signal in a video system such as a television. That is, a luminance processor 2 and a chrominance processor 3 are connected to an output node of a Y/C separator 1 for separating the luminance and chrominance signals from the composite video signal.

The Y/C separator 1 comprises a low pass filter and a band pass filter so that the luminance signal is extracted through the low pass filter while the chrominance signal is extracted through the band pass filter.

The luminance processor 2 caries out control of contrast and the compensation for contour, and the chrominance processor 3 carries out demodulation of the chrominance signal. The chrominance processor 3 is connected through a burst-processor 4 to the Y/C separator 1 so that the chrominance signal is demodulated on the basis of a burst signal in the demodulation of the chrominance signal.

A synchronous-separator 6 separates horizontal and vertical synchronous signals, which are commonly included in the composite video signal, from each other and provides them to a deflector 7 so that both signals are displayed at a desired position on a picture. A matrix 5 is connected to the luminance processor 2 and to the chrominance processor 3 for carrying out the arithmetic operation, thereby to provide a desired color signal among R, G, and B.

However, in an analog TV receiver as above, the composite video signal is subcarried in a luminance signal band and a modulated chrominance signal is superposed, as shown in FIG. 2(A), so that the perfect separation of the luminance and chrominance signals is very difficult.

FIG. 2(A) shows the Y/C signal bands of the composite video signal. The conventional Y/C separator 1 as shown in FIG. 1 extracts the luminance signal by applying the composite video signal to the low pass filter and also extracts the chrominance signal by applying the composite video signal to the band pass filter. In that case, high frequency components are to be lost in the luminance signal and such high frequency components of the luminance signal are to be included in the chrominance signal band, therefore there is a further problem that a cross color disturbance phenomenon occurs (refer to FIG. 2(B) and (C)).

In order to overcome these problems, a comb filter is adapted which can separates definitely the luminance and chrominance signals from each other. The comb filter can separate the luminance and chrominance signals from each other more definitely if the interleave between the horizontal synchronous signal and the chrominance subcarrier signal is satisfactory, thereby improving the resolution.

Now, with reference to FIG. 2(A), a sub carrier frequency fsc of 3.58 MHz in the composite video signal and a horizontal synchronous frequency fH are related by relation fomular I as follows.

$$fsc = \frac{455}{2} \times fH \qquad \text{I}$$

Thus, it represents that the chrominance subcarrier frequency is interleaved according to the horizontal synchronous frequency. And an H-Comb filter is adapted for the separation of luminance and chrominance signals having the above functional relation.

In more detail, FIG. 3(A) and (B) are shown composite video signal lines n and n+1, respectively in which the subcarrier frequency has an odd value, as given by relation formular I, when a present composite video signal is the same with next one. The phase of the chrominance signal including the burst signal is changed approximately 180 degrees, while the luminance signal remains unchanged. Thus, the luminance signal as shown in FIG. 3(C) is obtained by adding the lines together and next dividing the result by 2, while the chrominance signal as shown in FIG. 3(D) is obtained by subtracting one line from the other line and next dividing the result by 2. This Y/C separation method using the H-comb filter prevents the loss of high frequency components of the luminance signal so that it is applied for a high-grade television.

However, the relation fomular I is not accurately applied in home video game systems in the market, or still, in double speed modes of VTR, so that the method of separating the chrominance signal by using the H-comb filter brings about more loss of the image rather than simply using a band pass filter.

Therefore, in order to obtain a better image quality, it is desirable that the chrominance signal be selected from the output of the comb filter if the interleave is satisfactorily kept and that the chrominance signal be selected from the output of the band pass filter if the interleave is not satisfactorily kept in response to discriminating the interleave between the horizontal synchronous signal and the chrominance subcarrier signal.

SUMMARY OF THE INVENTION

The present invention has an object to provide an interleave detector which detects the interleave between a horizontal synchronous signal and a chrominance subcarrier signal of a composite video signal in such a manner that a burst signal of the composite video signal is 1H delayed to be added to the original signal thereof for squaring the added output so as to extract the phase error by filtering the squared output through the low pass filter.

According to the present invention, there is provided an interleave detector between a horizontal synchronous signal and a chrominance subcarrier signal, comprising:

a 1H-delay part for providing a 1H-delayed output of a continuous burst signal after receiving said burst signal from a composite video signal;

an adder for adding the delayed output of said 1H-delay part to the original continuous burst signal;

a squarer for squaring an output of said adder;

a low pass filter for filtering an output of said squarer; and a comparator for comparing an output level of said low pass filter with a reference level, wherein a distinguishing signal can be provided for distinguishing when a more and/or less phase error is occurred than an allowable reference range of the phase error in such a manner that an output value from the low pass filter corresponding to the phase error between the continuous burst signal and the 1H-delayed signal thereof is compared with the reference level.

BRIEF DESCRIPTION OF THE DRAWINGS

These and other objects, features, and advantages of the present invention will become more apparent from the following description for the preferred embodiments taken in conjunction with the accompanying drawings, in which:

FIGS. 3a-c are diagrams illustrating waveforms of each composite video signal, luminance signal and chrominance signal;

DETAILED DESCRIPTION OF THE PREFERRED EMBODIMENT

The present invention will now be described in more detail with reference to the accompanying drawings.

Figure 1:
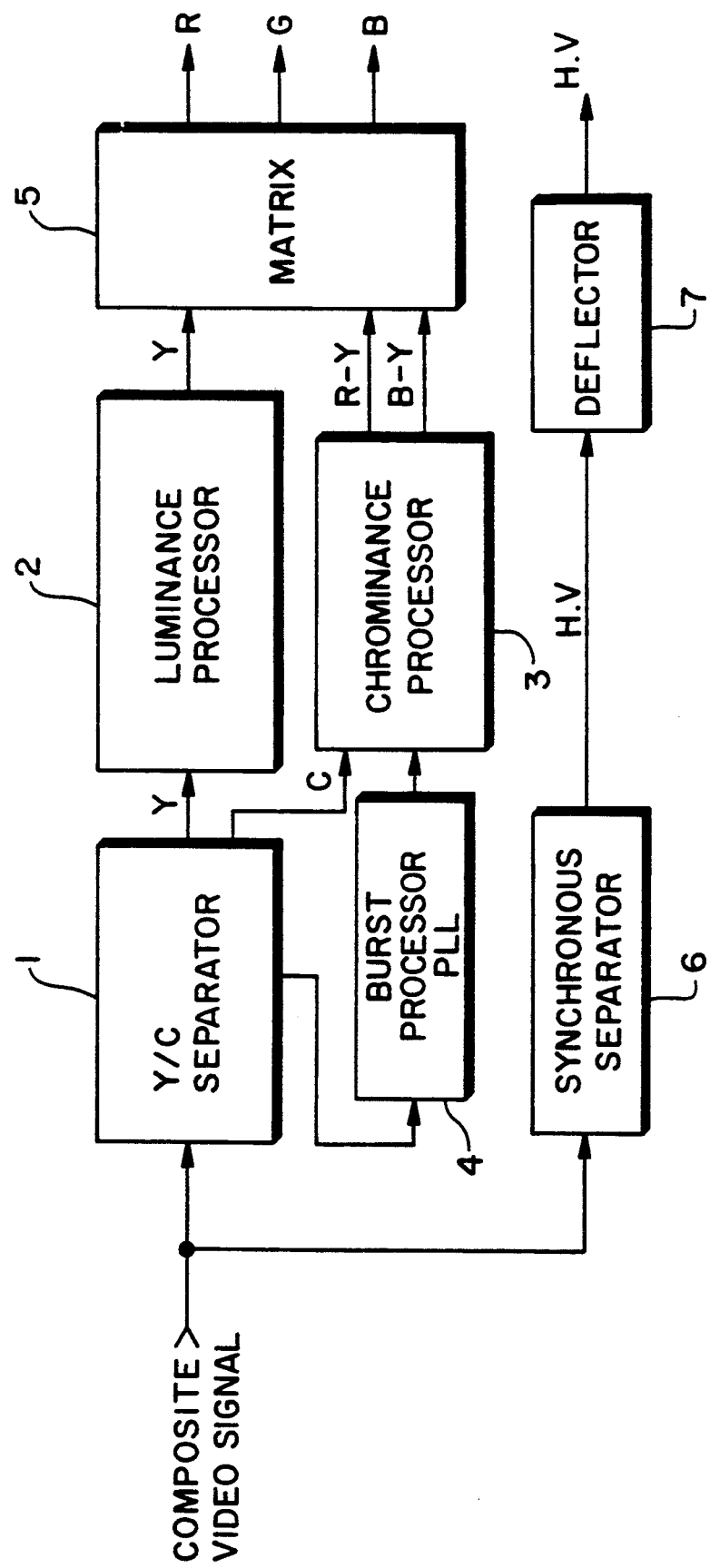
FIG. 1 is a block diagram of a conventional separator which separates the three primary color signals of red R, green G, and blue B of light from a composite video signal.
Figure 2:
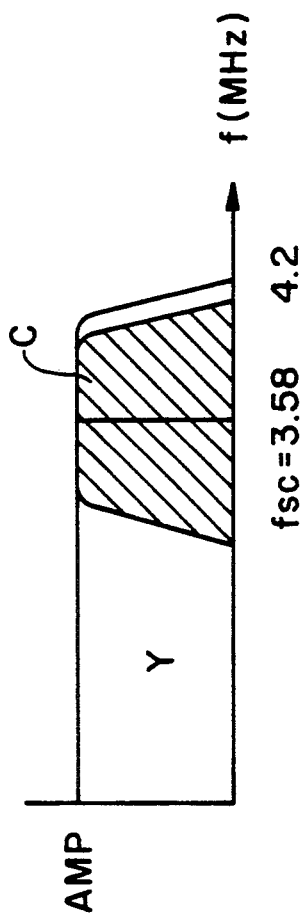
FIGS. 2a-c are band diagrams of a luminance signal Y and a chrominance signal C of the conventional composite video signal according to FIG. 1.
Figure 2:
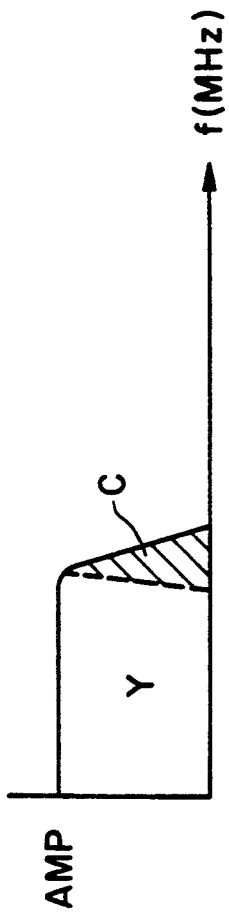
Figure 2:
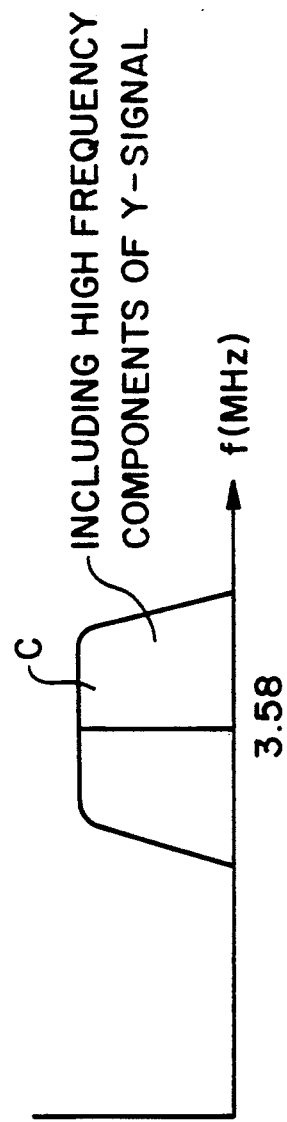
Figure 4:
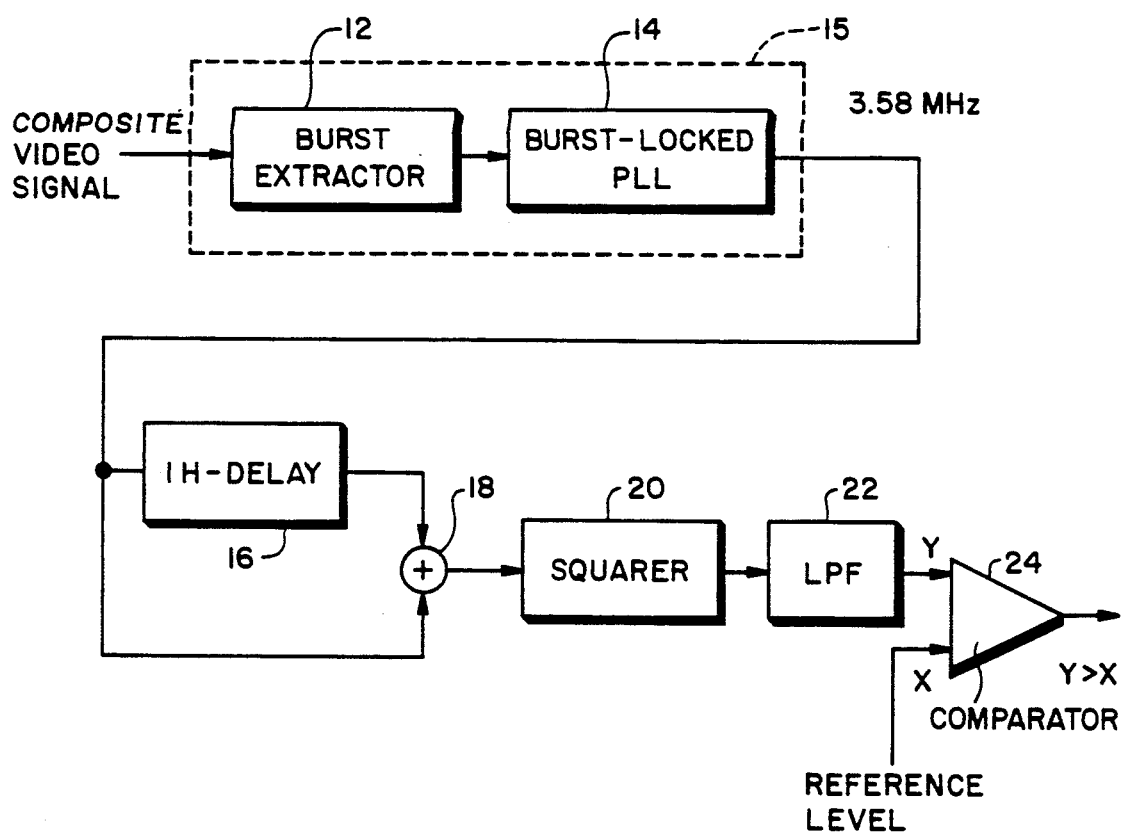
FIG. 4 is a diagram illustrating an embodiment of an interleave detector according to the present invention.

FIG. 4 is a diagram illustrating an embodiment of an interleave detector of a composite video signal according to the present invention. In FIG. 4, a continuous burst signal generator 15 includes a burst extractor 12 whereto the composite video signal is applied and a burst-locked PLL 14 which is connected to the output of the extractor 12, generator 15 not being an essential component of the present invention. Hereto, the term "PLL" means phase-locked loop as a conventional meaning in this art.

The composite video signal applied to the burst extractor 12 is provided as a continuous burst signal of 3.58 MHz at the output of the burst-locked PLL 14 so that this signal is applied to both of a 1H delay circuit 16 and an adder 18. This 1H-delay circuit 16 receives the continuous burst signal of 3.58 MHz and provides the same after delaying for as must as one horizontal period.

The output of the 1H delay part is applied to another input terminal of the adder 18 and added to the original continuous burst signal for applying to a squarer 20. Then, the squarer 20 squares the sum of the 1H-delayed and the original continuous burst signals and provides the squared result value to a low pass filter LPF 22. Finally, the phase error is detected by filtering the output of the squarer 20 through the LPF 22. An output Y of the LPF 22 is applied to one input terminal of a comparator 24 to be compared with a reference level X of the other input terminal. The comparator 24 provides a logic signal "1" if the result of the comparison reveals that $Y > X$. Reference level X indicates a predetermined allowable error range and corresponding to a reference value for discriminating the magnitude of the phase error of the LPF 22.

The composite video signal having color difference signals R-Y and B-Y, being balance-modulated, includes a color reference phase signal for demodulation namely the burst signal. In the conventional video signal processor, this burst signal is extracted and a continuous burst signal which is locked to the extracted burst signal is generated. In that case, if the relation $$fsc = \frac{455}{2} \times fH$$

is held, the logic signal "0" is provided. Since the sum of the continuous burst signal A ($A = \cos\omega ct$) and its 1H-delayed signal B ($B = \cos(\omega ct + 180°)$) becomes zero according to the interleave relation; that is $A + B = \cos\omega ct + \cos(\omega ct + 180°) = 0$.

But, if a phase error $\phi$ exists between both signals the sum of the signals becomes $$\begin{aligned} A + B &= \cos\omega ct + \cos(\omega ct + 180° + \phi) \\ &= \cos\omega ct - \cos(\omega ct + \phi) \\ &= \cos\omega ct - \{\cos\omega ct \cos\phi - \sin\omega ct \sin\phi\} \\ &= (1 - \cos\phi)\cos\omega ct + \sin\phi \sin\omega ct \\ &= \sqrt{(1 - \cos\phi)^2 + (\sin\phi)^2} \cos(\omega ct + \theta) \end{aligned}$$

wherein $$\theta = \tan^{-1}\frac{-\sin\phi}{1 - \cos\phi}.$$

Consequently, $$A + B = \sqrt{2 - 2\cos\phi} \cos(\omega ct + \theta).$$

Squaring this by the squarer 20, next, gives $$\begin{aligned} (A + B)^2 &= 2(1 - \cos\phi) \times \cos^2(\omega ct + \theta) \\ &= 3(1 - \cos\phi) \times \frac{1 + \cos(2\omega ct + 2\theta)}{2} \\ &= (1 - \cos\phi) + (1 - \cos\phi) \cdot \cos(2\omega ct + 2\theta) \end{aligned}$$

wherein $\cos 2\theta = 2\cos^2\theta - 1$

Figure 5:
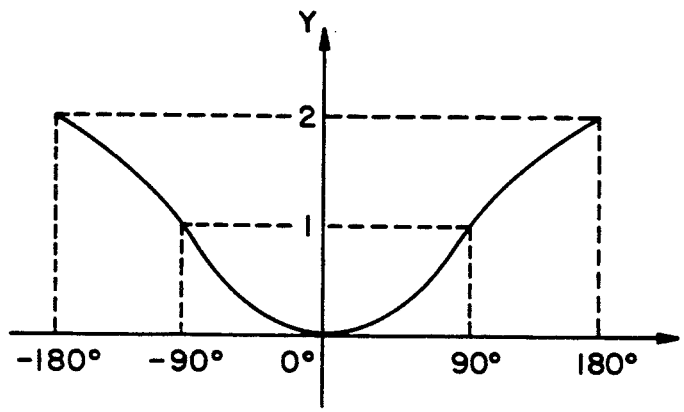
FIG. 5 is a diagram illustrating a relation between a phase error and a detected output.

Finally, the cos $2\omega ct$ component is filtered by the LPF 22 from the squared value and the comparator 24 is provided with a final value Y wherein $Y = 1 - \cos\phi$. FIG. 5 is a graphic diagram illustrating the relation between the value Y and the phase error.

The output value Y is positioned in a range from 0 to 2. Thus, if the reference value X is applied in the range from 0 to 2 as another input for H-comb filtering from an external source, such as from a microcomputer, the logic signal "0" is provided from the comparator 24 when the interleave relation is kept, while the logic signal "1" is provided when the interleave relation deviates from the allowable range.

Figure 6:
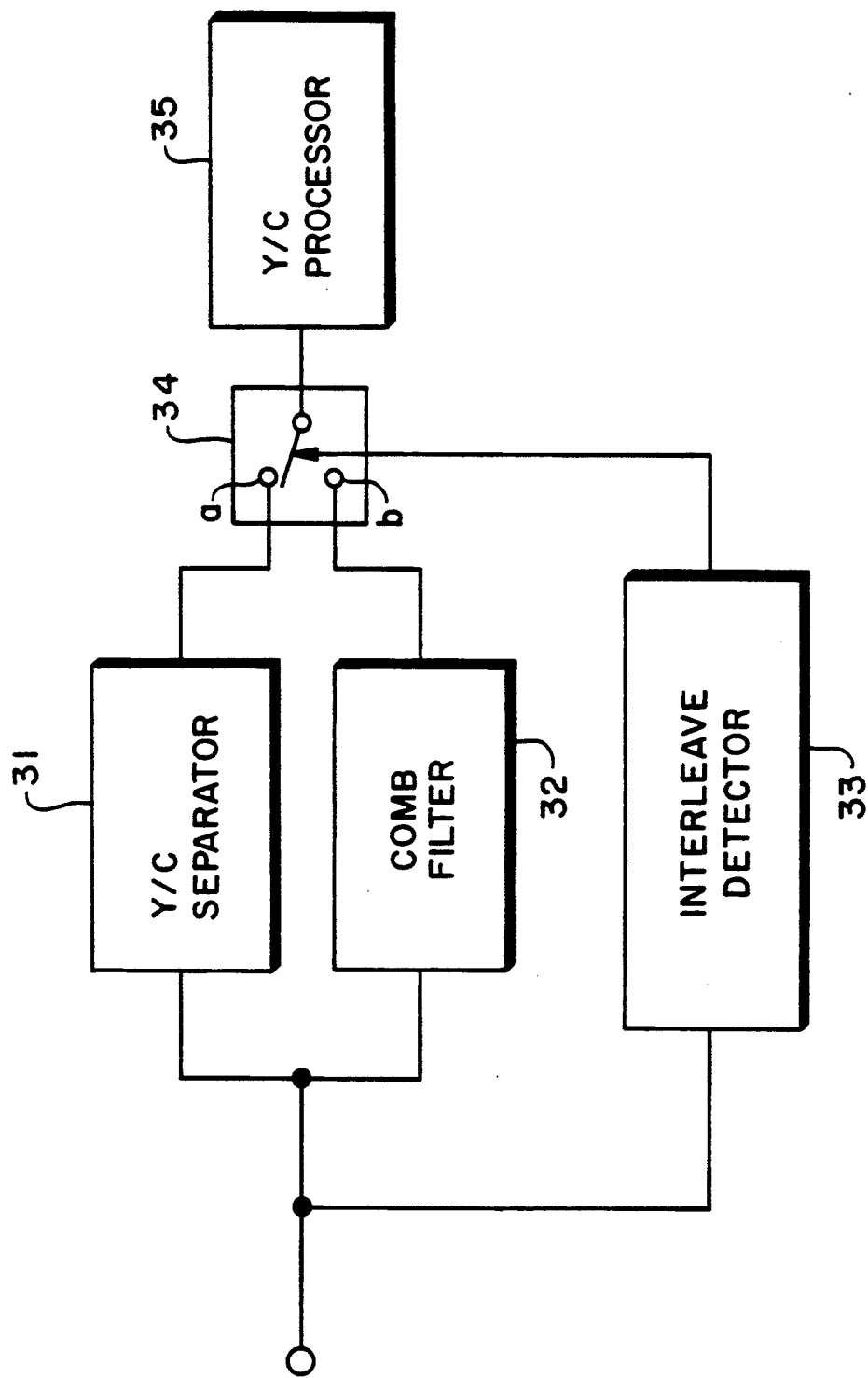
FIG. 6 is a circuit diagram illustrating the switching state of an interleave detector.

FIG. 6 is a circuit diagram illustrating the switching state of the interleave detector according to the present invention. In FIG. 6, a switching part 34 is connected to output nodes of a Y/C separator 31 and a comb filter 32 which receives the composite vide signal, and an interleave detector 33 described hereto is connected to the switching part 34. Also, a Y/C processor 35 is connected to the output node of the switching part 34 to process the luminance and chrominance signals. As described above, the Y/C separator 31 and the comb filter 32 separates the luminance and chrominance signals from the composite video signal.

If the interleave detector 33 as shown in FIG. 6 detects a satisfactory interleave relation, the logic signal "0" is provided to the switching part 34 and the switch of the switching part 34 is connected to an node "b", thereby selecting an output rate of the comb filter 32. Conversely, if the interleave relation is undesirous, the switch is set to node "a" by a logic signal "1" from interleave detector 33, thereby selecting the output of the Y/C separator 31 to achieve a high quality video signal.

As mentioned up to now, the present invention can detect an interleave relation between a horizontal synchronous signal and a chrominance subcarrier signal by delaying the continuous burst signal by one horizontal period 1H and adding it to the original burst signal thereof. The sum of the 1H-delayed and original signals is squared for extracting the phase error through the low pass filter and comparing the phase error with the reference value of the allowable range which is provided from an external source. A distinguishing signal which descriminates a possible phase error in accordance with an allowable reference range, is used to detect an interleave between the horizontal synchronous signal and the chrominance subcarrier.

The interleave detector according to the present invention can be usefully applicable for a Y/C separating filter which locks the system clock of a digital signal processor to a horizontal frequency.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An interleave detector for detecting an interleave relation between a horizontal synchronous signal and a chrominance subcarrier signal of a composite video signal, comprising:

1H-delay means for providing a 1H-delayed output of a continuous burst signal after receiving and discriminating the continuous burst signal from said composite video signal;

an adder for adding the delayed output of said 1H-delay means to the original continuous burst signal;

a squarer for squaring the output of the adder;

a low pass filter for filtering an output of said squarer; and a comparator for comparing a filtered output level of said low pass filter with a reference level and providing a distinguishing signal in response to the comparison to indicate whether a phase error exists within a predetermined allowable reference range of the phase error.

2. An interleave detector according to claim 1, wherein said continuous burst signal extracted from the composite video signal has a frequency of approximately 3.58 MHz.

3. An interleave detector according to claim 1, wherein said reference level is externally provided to said comparator, said reference level having a value indicative of an allowable range of the phase error.

* * * * *